US009292879B1

(12) United States Patent
Lu et al.

(10) Patent No.: US 9,292,879 B1
(45) Date of Patent: Mar. 22, 2016

(54) SYSTEMS AND METHODS FOR GENERATING AND PRESENTING SOCIAL MARKERS

(75) Inventors: James F. Lu, Seattle, WA (US); Christopher Duane Furniss, Seattle, WA (US); James Fisher Robinson, Jr., Seattle, WA (US); Rudy B. Gajadhar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 507 days.

(21) Appl. No.: 13/430,424

(22) Filed: Mar. 26, 2012

(51) Int. Cl.
*G06F 15/16* (2006.01)
*G06Q 50/00* (2012.01)
*G06Q 30/02* (2012.01)

(52) U.S. Cl.
CPC ............... *G06Q 50/01* (2013.01); *G06Q 30/02* (2013.01); *G06Q 30/0241* (2013.01); *G06Q 30/0251* (2013.01)

(58) Field of Classification Search
CPC ... G06Q 50/01; G06Q 30/02; G06Q 30/0241; G06Q 30/0251
USPC ........................ 705/14.53–14.55, 319, 347; 709/201–217
See application file for complete search history.

(56) References Cited

U.S. PATENT DOCUMENTS

| | | | | |
|---|---|---|---|---|
| 8,069,267 | B2* | 11/2011 | Powers-Boyle et al. | 709/246 |
| 2005/0120306 | A1* | 6/2005 | Klassen et al. | 715/765 |
| 2007/0129146 | A1* | 6/2007 | Tzruya et al. | 463/42 |
| 2009/0044246 | A1* | 2/2009 | Sheehan et al. | 725/146 |
| 2009/0299824 | A1* | 12/2009 | Barnes, Jr. | 705/10 |
| 2011/0153504 | A1* | 6/2011 | Rojas et al. | 705/75 |
| 2011/0238472 | A1* | 9/2011 | Sunkada | 705/14.23 |
| 2011/0320250 | A1* | 12/2011 | Gemmell et al. | 705/14.16 |
| 2011/0320373 | A1* | 12/2011 | Lee et al. | 705/319 |
| 2012/0203623 | A1* | 8/2012 | Sethi et al. | 705/14.43 |
| 2013/0054480 | A1* | 2/2013 | Ross et al. | 705/319 |
| 2013/0246138 | A1* | 9/2013 | Johnson et al. | 705/14.16 |

OTHER PUBLICATIONS

Smith (Smith, Mari, 21 Creative Ways to Increase Your Facebook Fanbase, Apr. 27 2010, socialmediaexaminer.com, retrieved from http://www.so cialmediaexaminer.co m/21-creative-ways-to -increase-your-facebook-fanbase/, pp. 1-8).*
Facebook (Facebook, Yoono 7 Notifications and Unread Messages Explained, Feb. 8, 2010 at 2:16pm, retrieved from http://www.facebook.com/notes/yoono/yoono-7-notifications-and-unread-messages-explained/295412962258?comment_id=10878344&offset=0&total_comments=1, pp. 1-6; hereinafter Facebook2010).*
Pandey (Pandey, Vaibhav, Mac App Store—Getting Started and First Thoughts, Jan. 6, 2011, Technofriends, retrieved from http://www.technofriends.in/2011/01/06/mac-app-store-getting-started-and-first-thoughts/ on Oct. 15, 2014).*
Tripadvisor (Tripadvisor, Fox, Linda, ttnooz, retrieved from http://www.tnooz.com/article/tripadvisor-not-to-claim-reviews-are-real-honest-or-trusted-says-uk-regulator/, on Aug. 12, 2015).*

* cited by examiner

*Primary Examiner* — Brian J Gillis
*Assistant Examiner* — Michael A Keller
(74) *Attorney, Agent, or Firm* — Sutherland Asbill & Brennan LLP

(57) ABSTRACT

A social marker is generated from data about user relationships and interactions with consumer objects such as brands, products, services, or a combination thereof. The social marker provides an indicator to a target user that someone they have a relationship with has taken some action associated with the consumer object. This action may include, but is not limited to, posting a comment, a rating, a recommendation, and so forth about the consumer object.

22 Claims, 9 Drawing Sheets

SYSTEMS AND METHODS FOR GENERATING AND PRESENTING SOCIAL MARKERS

BACKGROUND

Online merchants offer a wide variety of brands, products, and services. Effective and meaningful distribution of information which is personally relevant to individual users would enhance overall customer experience.

Figure 1:
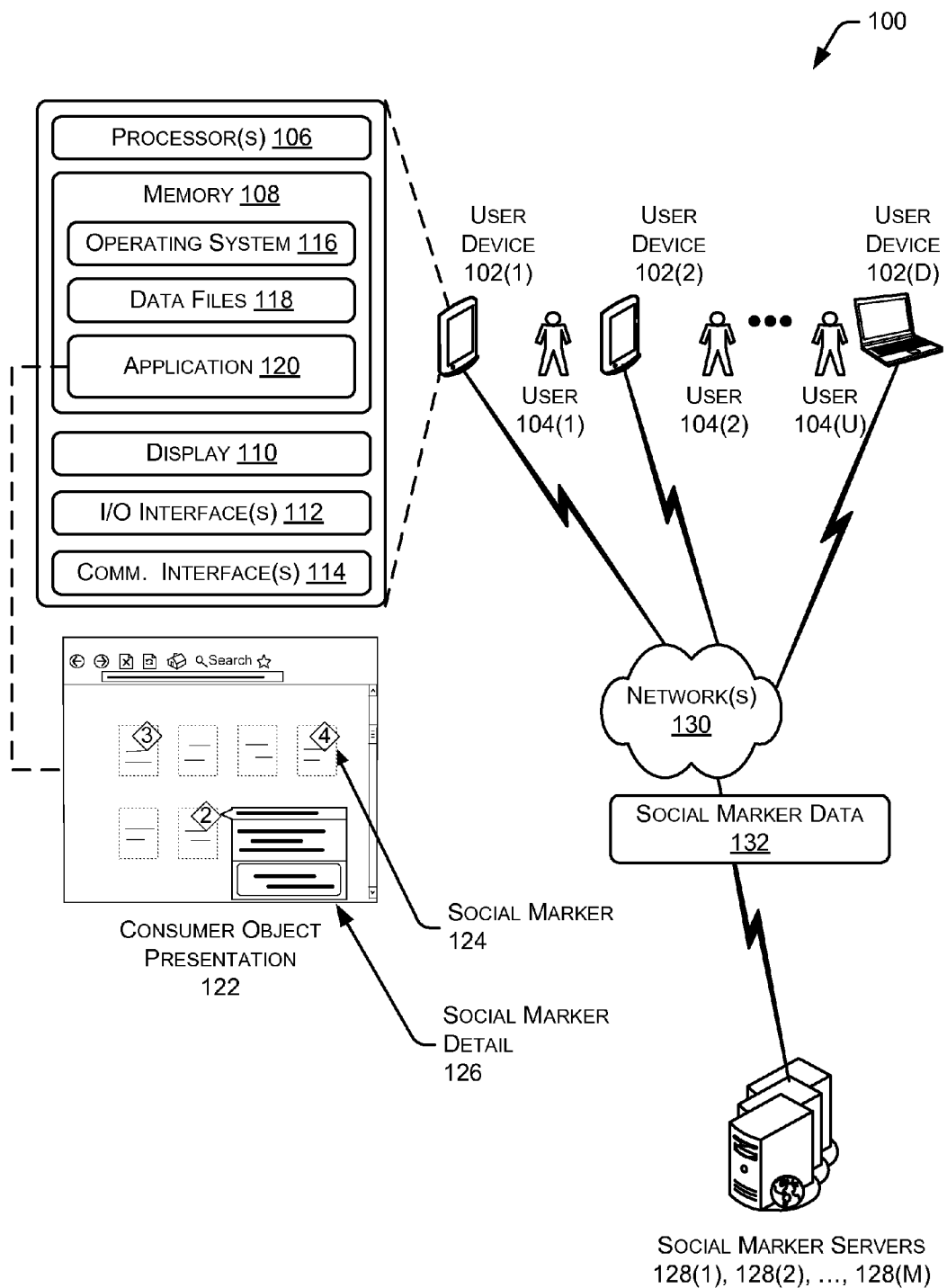
FIG. 1 illustrates a system for generating and presenting social markers in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Online merchants offer a wide variety of consumer objects such as brands, products, and services to consuming users. Providing effective and meaningful distribution of information, which is personally relevant to the consumer users, benefits the users and merchants. For example, meaningful communication allows users to more readily discern consumer objects of interest while merchants are able to focus marketing and other resources on those users.

Described herein are systems and methods for generating social marker data and presenting that social marker data as a social marker in a user interface. This user interface may be provided by user devices executing Internet browsers, dedicated applications, and so forth. Interaction data is collected or accessed, which describes how a target user and other users have related with consumer objects. Interaction data may include, but is not limited to, inquiries, page views, purchases, shares, replies, messages, recommendations, blog entries, modification of a wish list, or a combination thereof associated with one or more consumer objects. Interaction data may also include actions associated with the consumer object as associated with the target user. For example, interaction data may additionally include, but is not limited to, fulfillment notifications, shipping information, product availability, previous purchase history, and so forth.

Data describing one or more relationships between users is accessed or collected to determine a relationship between the target user and other users. Relationships may be explicitly determined such as by the user specifying a social network, inferential such as where a relationship is assumed between multiple users with the same payment information, and so forth. As used herein, "related" and "relationship" indicate an affiliation between two or more parties. This affiliation may be legal (such as married spouses), filial (such as siblings), organizational (such as being members of the same club), professional, friendly, and so forth. Social marker data is determined based at least in part on the interaction data and the relationship. This social marker data may be specific to a particular target user, or a group of target users.

Once determined, the social marker data may be used to generate a social marker. The social marker is a prompt presented to the target user indicating that interaction data pertinent to that target user is available. The prompt may be presented visually, audibly, haptically, or a combination thereof. For example, where the social marker is presented visually, a particular icon such as a heart shape, with a number indicating a quantity of interaction data available, may be presented superimposed upon, or adjacent to, the consumer object associated therewith.

The social marker may be configured to present additional detail information. When so configured, user selection of the social marker results in presentation of additional information, such as at least a portion of the interaction data. After presentation of the detail information, the social marker may be removed from presentation. The social marker thus provides the target user with an unobtrusive mechanism to easily see information about the consumer object which is relevant to them.

Illustrative System

FIG. 1 illustrates a system 100 for generating social marker data and presenting one or more social markers in accordance with an embodiment of the disclosure. One or more user devices 102(1), 102(2), . . . 102(D) may be used by one or more users 104(1), 104(2), . . . 104(U). As used herein, letters enclosed by parenthesis such as "(U)" indicate an integer having a value greater than or equal to zero. The users 104 may include, but are not limited to, consumer users, trusted expert users, commentators, reviewers, bloggers, representatives, merchants, vendors, suppliers, and so forth. The users 104 may include humans and entities such as companies, associations, governments, and so forth.

The user devices 102 may include smartphones, laptops, desktops, tablet computers, televisions, set-top boxes, game consoles, in-vehicle computer systems, and so forth. The user devices 102 may comprise one or more processors 106, one or more memories 108, one or more displays 110, one or more input/output ("I/O") interfaces 112, and one or more communication interfaces 114.

The processors 106 may comprise one or more cores and are configured to access and execute at least in part instructions stored in the one or more memories 108. The one or more memories 108 comprise one or more computer-readable storage media ("CRSM"). In some embodiments, the one or more memories 108 may include non-transitory media such as random access memory ("RAM"), flash RAM, magnetic media, optical media, solid state media, and so forth. The one or more memories 108 may be volatile in that information is retained while providing power or non-volatile in that information is retained without providing power. Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal.

The display 110 is configured to present visual information to the user 104. The display 110 may comprise a reflective or emissive display configured to present images which appear to be two- or three-dimensional to the user 104. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 110 may be configured to present images in monochrome, color, or both. In some implementations the display 110 of the user device 102 may use emissive, reflective, or combination displays with emissive and reflective elements.

The one or more I/O interfaces 112 may also be provided in the user device 102. These I/O interfaces 112 allow for coupling devices such as keyboards, joysticks, touch sensors, cameras, microphones, speakers, haptic output devices, memories, and so forth to the user device 102. The haptic output device may comprise one or more actuators, signal generators, and so forth. For example, the haptic output device may generate direct electrical stimulation of nerves of the user 104, actuate a piezoelectric element, actuator a motor, and so forth.

The one or more communication interfaces 114 may provide for the transfer of data between the user device 102 and another device directly such as in a peer-to-peer fashion, via a network, or both. The communication interfaces 114 may include, but are not limited to, personal area networks ("PANs"), wired local area networks ("LANs"), wireless local area networks ("WLANs"), wireless wide area networks ("WWANs"), and so forth. The communication interfaces 114 may utilize acoustic, radio frequency, optical, or other signals to exchange data between the user device 102 and another device such as an access point, a host computer, a server, a router, a reader device, another user device 102, and the like.

The one or more memories 108 may store instructions for execution by the processor 106 to perform certain actions or functions. These instructions may include an operating system 116 configured to manage hardware resources such as the I/O interfaces 112 and provide various services to applications executing on the processor 106. The one or more memories 108 may also store data files 118 containing information about the operating system, social marker data, configuration files, and so forth.

An application 120 is stored in the one or more memories 108. The application 120 may comprise an Internet browser, a stand-alone application, a client application, and so forth. The application 120 is configured to present a consumer object presentation 122 via the display 110 or another output device coupled to the I/O interface 112. The consumer object presentation 122 may comprise one or more social markers 124 and associated social marker detail 126. The social marker 124 and the social marker detail 126 are configured to provide information about interactions associated with one or more consumer objects and a target user 104. The social marker 124 provides an indication that information about one or more interactions associated with the one or more consumer objects is available. The social marker detail 126 provides more detailed information about at least a portion of those interactions. In some implementations, the social marker 124 and the social marker detail 126 may be filtered such that previously viewed interactions or portions thereof are not shown. For example, after viewing the social marker detail 126 associated with the social marker 124, the social marker 124 will not be displayed again until new interactions are available. The social marker 124 and the social marker detail 126 are described below in more detail.

The application 120 may access the data files 118 or the one or more social marker servers 128(1), 128(2), . . . , 128(M) via a network 130 to acquire social marker data 132. The social marker server 128 generates the social marker data 132 which may comprise a markup language such as hyper-text markup language ("HTML") or extensible markup language ("XML"), a script, a graphic, a widget, and so forth. The social marker data 132 when presented provides information in the form of the social marker 124 and social marker detail 126 about interaction data relevant to a target user 104. This interaction data may include messages, status updates, recommendations, modification of wish lists, and so forth. While the social marker server 128 is depicted as a separate server, in some implementations, the social marker server 128 or functionality associated therewith may be provided by the application 120 or another application executing at least in part on the user device 102. Generation of the social marker 124 and the social marker detail 126 is discussed below in more detail with regard to FIG. 2. This presentation provider may comprise a server as shown, the user device 102, or a combination thereof. The network 130 may comprise one or more private networks, public networks such as the Internet, or a combination of both configured to transfer data between two or more devices.

While various functions are described above with respect to particular devices, it is understood that these functions may be distributed in many ways across the devices. In one example, the social marker server 128 functionality may be provided at least in part by the user device 102. In another example, the application 120 of the user device 102 may access information from a third-party server in response to executing the social marker data 132 for presentation on the display 110.

The social marker server 128 may also be use in conjunction with a merchant service which provides for buying, selling, leasing, renting, and so forth consumer objects. In one implementation, the social marker server 128 may be configured to provide social markers 124, advertisements which include social markers 124, or a combination thereof, to a merchant. For example, the merchant service may contract with an entity operating the social marker server 128 such that banner ads containing social markers 124 are presented by the merchant service. Thus, the social marker 124 may be configured to be visible to the user 104 as they utilize different resources such as web sites and other services.

Figure 2:
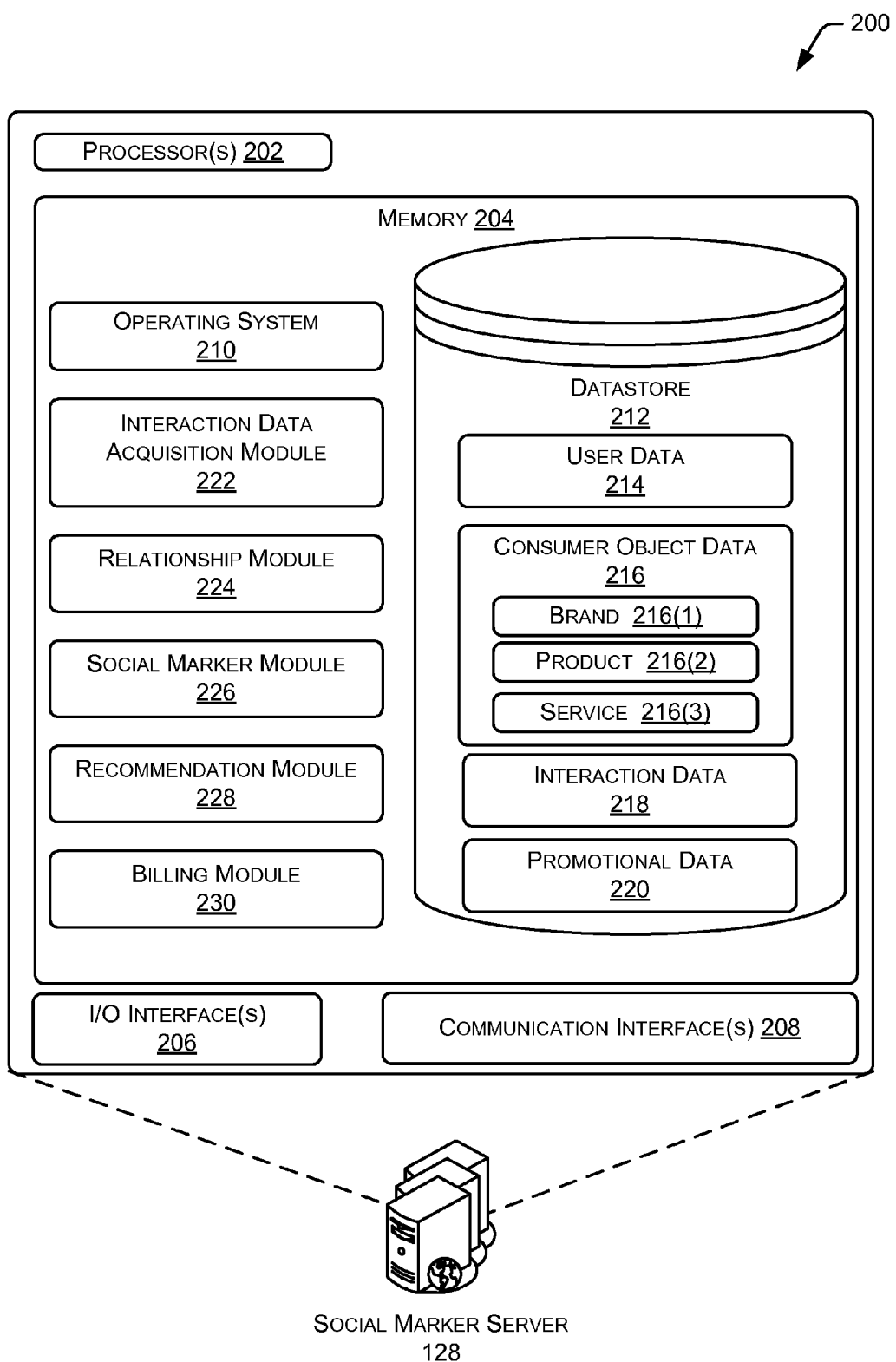
FIG. 2 illustrates a block diagram of a social marker server configured to generate social marker data.

FIG. 2 illustrates a block diagram 200 of the social marker server 128. The social marker server 128 is configured to generate the social marker data 132. When executed or otherwise processed, such as by the user devices 102, this data presents social markers 124, social marker detail 126, or both to the user 104. The social marker server 128 may be deployed in a stand-alone server such as depicted here, distributed across multiple servers, provided as a cloud service, reside as an application on the user device 102, and so forth.

The social marker server 128 comprises one or more processors 202, one or more memories 204, one or more I/O interfaces 206, and one or more communication interfaces 208. The one or more processors 202 may individually comprise one or more cores and are configured to access and execute at least in part instructions stored in the one or more memories 204. The one or more memories 204 comprise one or more CRSMs.

Similar to those described above, the one or more I/O interfaces 206 allow for coupling of devices such as displays, keyboards, storage devices, and so forth to the one or more processors 202 of the social marker server 128. Likewise, the one or more communication interfaces 208 may be configured to couple the social marker server 128 to one or more networks 130.

The one or more memories 204 may store instructions for execution by the one or more processors 202 which perform certain actions or functions. These instructions may include an operating system 210 configured to manage hardware resources, such as the I/O interfaces 206, and provide various services to applications executing on the one or more processors 202.

The one or more memories 204 may also store one or more datastores 212 containing information. These datastores may comprise lists, arrays, databases, flat files, and so forth. In some implementations, the datastores 212 may be stored in memory external to the social marker server 128 but accessible via the network 130, such as with a cloud storage service.

The datastore 212 may store a variety of information such as that described below. The datastore 212 may store user data 214 about the users 104 including one or more of user identifications, social marker preferences, privacy settings, social network data, and so forth. This user data may include relationship data, such as connections within a social network, user affiliations, and so forth.

Consumer object data 216 may be stored. This may include brand data 216(1), product data 216(2), service data 216(3), or a combination thereof. The brand data 216(1) may include a designation, mark, term, symbol, text, sound, color, fragrance, and so forth which identifies one or more products or services. The brand data 216(1) may also include target demographics, affiliations with other brands, and so forth. The product data 216(2) may include descriptions, characteristics, target demographics, terms of use, and so forth. The service data 216(3) may include descriptions, characteristics, service availability, terms of use, target demographics, and so forth.

Interaction data 218 may be stored in the datastore 212. The interaction data 218 describes one or more interactions of one or more users 104 involving one or more of the consumer objects. These interactions may include, but are not limited to, inquiries, page views, purchases, shares, replies, messages, recommendations, blog entries, or a combination thereof associated with the one or more consumer objects. For example, the user 104(1) may be presented with an advertisement for a product, click on the advertisement, and proceed to view detail information about the product. These actions comprise interactions between the user 104(1) and the product. The user 104(1) may then activate a command to share that advertisement with user 104(2) who is related to the user 104(1), generating another interaction, this time between users 104(1), 104(2), and the product. In one implementation, the interaction data 218 may comprise a message entered by one of the one or more users 104.

Promotional data 220 may also be stored. The promotional data 220 may include discounts, incentives, rebates, coupons, and so forth which are associated with a brand, product, or service. For example, the promotional data 220 may comprise a manufacturer coupon offering a particular discount for a set period of time for products by that manufacturer.

An interaction data acquisition module 222 is configured to acquire the interaction data 218. The interaction data acquisition module 222 may be a stand-alone module or have functionality incorporated into other modules, such as a web page server module. The interaction data acquisition module 222 may retrieve interaction data from other modules, devices, and so forth, or may generate interaction data.

A relationship module 224 is configured to access information, such as that in the datastore 212, and determine and maintain relationship data associated with users 104. As used herein, "related" and "relationship" indicate an affiliation between two or more parties. This affiliation may be legal (such as married spouses), filial (such as siblings), organizational (such as being members of the same club), professional, friendly, and so forth. Relationships may be defined by frequency of contact, context of contact, duration of contact, or more. Relationships are thus connections between users 104 which are of some particular significance to the participants. For example, a user 104 may attribute much greater significance to a recommendation from a friend of many years than from a stranger on the street. Relationships may also be dynamic and change over time.

The relationship module 224 may determine relationships through explicit inputs, such as entries within a social network, manual entry by the user, and so forth. For example, a user 104 may enter user data 214 about other members of the household and indicate the relationship such as spouse, child, parent, roommate, and so forth. In some implementations, this data may be derived or included as part of the user data 214 that the user 104 may provide during interaction with a merchant. For example, the user 104(5) may set up an account with an online merchant and indicate that spouse user 104(6) has equal rights to make account changes, to make purchases, and so forth while child users 104(7) and 104(8) may only add items to a suggested shopping or wish list. Using this information, the relationships between these users 104(5)-104(8) as members of a family may be determined.

The relationship module 224 may also build relationship data using interaction data 218. An interaction between two or more users and a consumer object may be used to establish a relationship. For example, user 104(10) may share information about a particular product with user 104(11). This act of sharing may establish a relationship. The relationship may be strengthened by user 104(11) replying back to user 104(10), purchasing the particular product, and so forth.

A social marker module 226 is stored in the memory 204 and is configured to generate social marker data 132. The social marker module 226 is configured to access interaction data 218 comprising interactions between one or more users 104 and one or more consumer objects. For example, data about interactions associated with a particular product are accessed. The social marker module 226 determines a relationship between the one or more users and a target user 104. For example, the target user 104(1) is friends with users 104(2), 104(3), and 104(4). Social marker data 132 is determined based at least in part on the interaction data 218 and the determined relationship(s) with the target user. Continuing the example, interactions such as users 104(2), 104(3), and 104(4) posting comments on the particular product are processed to generate the social marker data 132.

The social marker data 132 may include the social marker detail 126, a social marker counter, and so forth. The social marker detail 126 provides the target user 104 a social marker detail element having at least a portion of the interaction data for presentation upon selection of the social marker. Continuing the example, at least a portion of the comments posted by related users 104(2), 104(3), and 104(4) may be presented. The social marker counter indicates a number of interactions, such as messages, associated with the consumer object from related users. The social marker counter may comprise a numeric representation of a value in a social marker counter. For example, the number "3" may appear in or adjacent to the social marker 124 indicating three interactions are available. In other implementations non-numeric representations may be used. For example, the social marker 124 may include a graph, color, animation, and so forth to indicate a number of interactions, priority, and so forth. In some implementations, the social marker data 132 may be filtered to show interactions associated with particular users 104 or groups of users. For example, the social marker data 132 may be filtered to show interactions from users who are members of the same extended family.

A user may select a social marker 124 by clicking, by hovering, by keyboard entry, by touch, and so forth. Upon selection, additional information, such as the social marker detail 126, may be presented. In some implementations, the social marker counter may be reset to zero before or after presentation of the social marker detail element. Thus, after viewing the social marker detail 126, the social marker 124 may no longer be presented to the user 104. In some implementations, the social marker counter may be reset after a pre-determined time interval. For example, if the user has not selected a social marker for one week, the counter may be reset and presentation of the social marker 124 discontinued until new interactions take place.

In another implementation, the social marker data 132 may be filtered to remove interactions which have aged beyond a pre-determined amount. For example, the social marker counter may be configured to count interactions which are less than two weeks old. As a result, older interactions may be omitted from the count.

The social marker module 226 may be configured to provide a social marker interface allowing the user 104 to access previously presented social markers 124, provide messages to other users, and so forth. For example, the user 104 may access the social marker interface to find and re-view a social marker 124 viewed last week.

A recommendation module 228 may be stored in the memory 204. The recommendation module 204 is configured to access social marker data 132 and provide one or more recommendations. These recommendations may be based at least in part on one or more of the user data 214, the consumer object data 216, the interaction data 218, or the promotional data 220, either alone or in combination. These recommendations may be presented to the users 104 via social markers 124.

A billing module 230 may be configured to bill or otherwise assess an entity for providing at least a portion of the functions described herein. In some implementations, an entity, such as a vendor, merchant, manufacturer, and so forth, may wish to provide a message to one or more of the users 104. The billing module 230 may be used to assess a fee for providing the message. In another implementation, the entity may be billed for each social marker 124 selected by the user 104. In another implementation, the billing module 230 may be used to assess a fee for providing a message within the social marker 124 or the social marker detail 126. For example, a fee may be assessed for a small banner ad inserted into the social marker detail 126.

Illustrative User Interface

Figure 3:
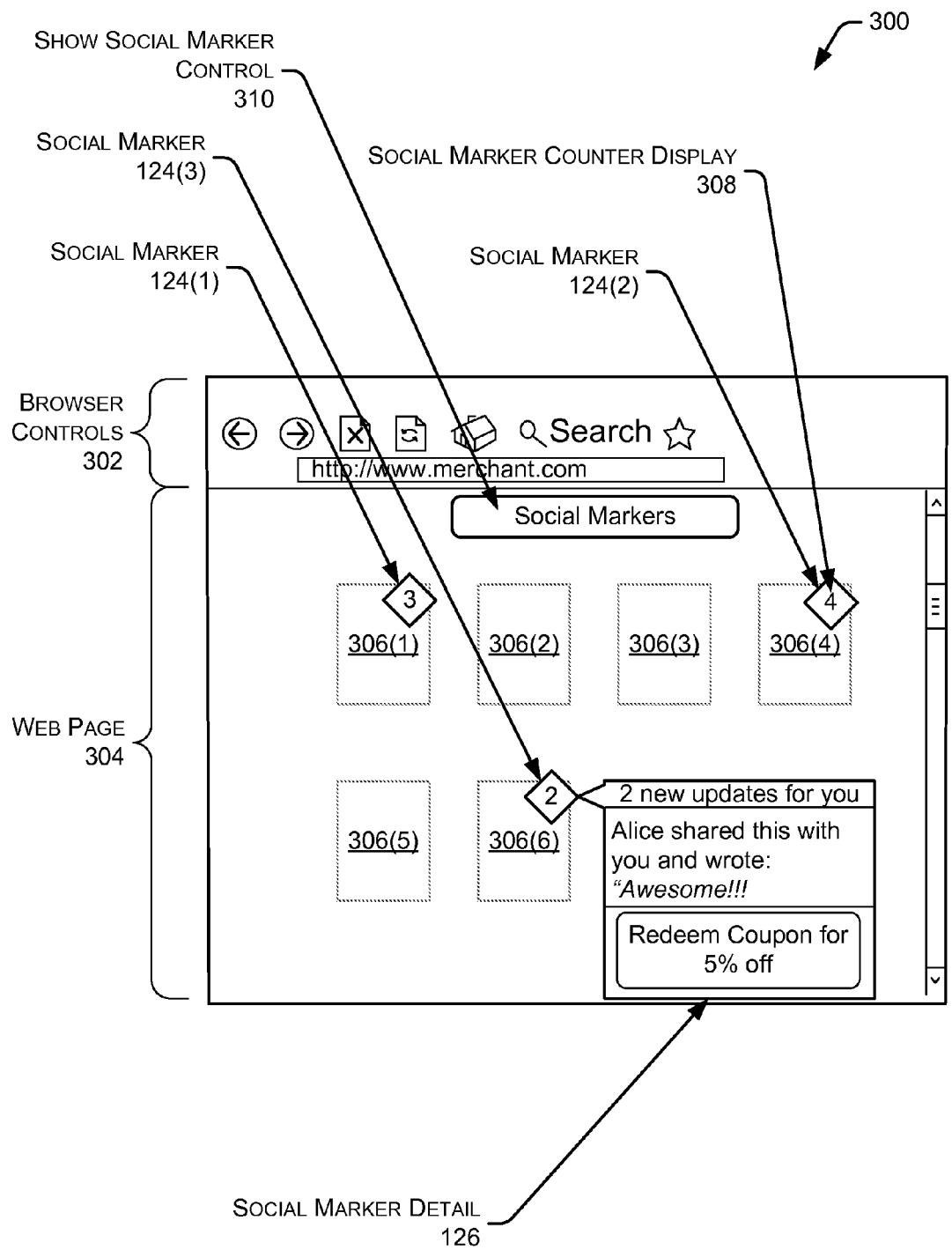
FIG. 3 illustrates a user interface including consumer objects and associated social markers.

FIG. 3 illustrates a user interface 300 including consumer objects and associated social markers. This user interface 300 may be provided by the application 120 on the user device 102. In some implementations, one or more portions of the user interface 300 may be provided by another device including, but not limited to, the social marker servers 128. While the user interface 300 is depicted as an Internet browser, in other implementations dedicated applications may be used to present the user interface 300 and the social markers 124. While the social marker 124 and the social marker detail 126 are illustrated as graphical or visually perceived output, in other implementations the presentation may be audible, haptic, or a combination thereof. For example, where the user device 102 includes a haptic output device, the social marker 124 may be presented as a change in apparent surface texture in one or more locations on the user device 104. In another implementation, the social marker 124 may comprise a particular sound or group of sounds presented from an apparent position in three-dimensional sound space as perceived by the user.

Browser controls 302 are presented, such as forward, backward, navigation, and so forth. At least a portion of a web page 304 is presented which comprises the consumer object presentation 122. Consumer objects 306(1), 306(2), . . . , 306(6), which may include brands, products, services, or a combination thereof, are depicted. Consumer objects 306(1), 306(4), and 306(6) have social markers 124(1), 124(2), and 124(3), respectively. As described above, the social marker module 226 generates social marker data 132. The user device 102 presents this social marker data 132 as a social marker 124 and social marker detail 126. In the implementation shown here, each of the social markers 124 includes a social marker counter display 308 which presents a numeric value associated with the social marker counter. In some implementations, this social marker counter may indicate a number of interactions associated with the social marker 124. While the social markers 124 are depicted herein with diamond icons, the social marker icons may comprise other shapes including, but not limited to hearts, animals, amorphous shapes, and so forth.

A social marker control 310 may also be presented. This control 310 may be presented on a particular page, included as part of a navigation header for the page, and so forth. The social marker control 310 may be configured to present social marker detail 126 for at least a portion of the social markers on the web page 308. This presentation may be configured as an overlay, popup, pullout drawer, additional layer, or configured as a separate web page. For example, upon activating the control 310 the user 104 may see a popup with social marker details 126 for all of the social markers 124 on the web page 304. In some implementations, this social marker detail 126 presentation may also include administrative controls such as selecting a social marker counter threshold, deselecting particular consumer objects, activating/deactivating presentation of social markers, and so forth.

Upon selection of the social marker 124(3) associated with the consumer object 306(6), the social marker detail 126 is presented. Here the social marker detail 126 provides information about the two associated interactions: one is a message from a related user 104 (Alice), and the other is a coupon. The social marker detail 126 is described in more detail next with regard to FIG. 4.

Figure 4:
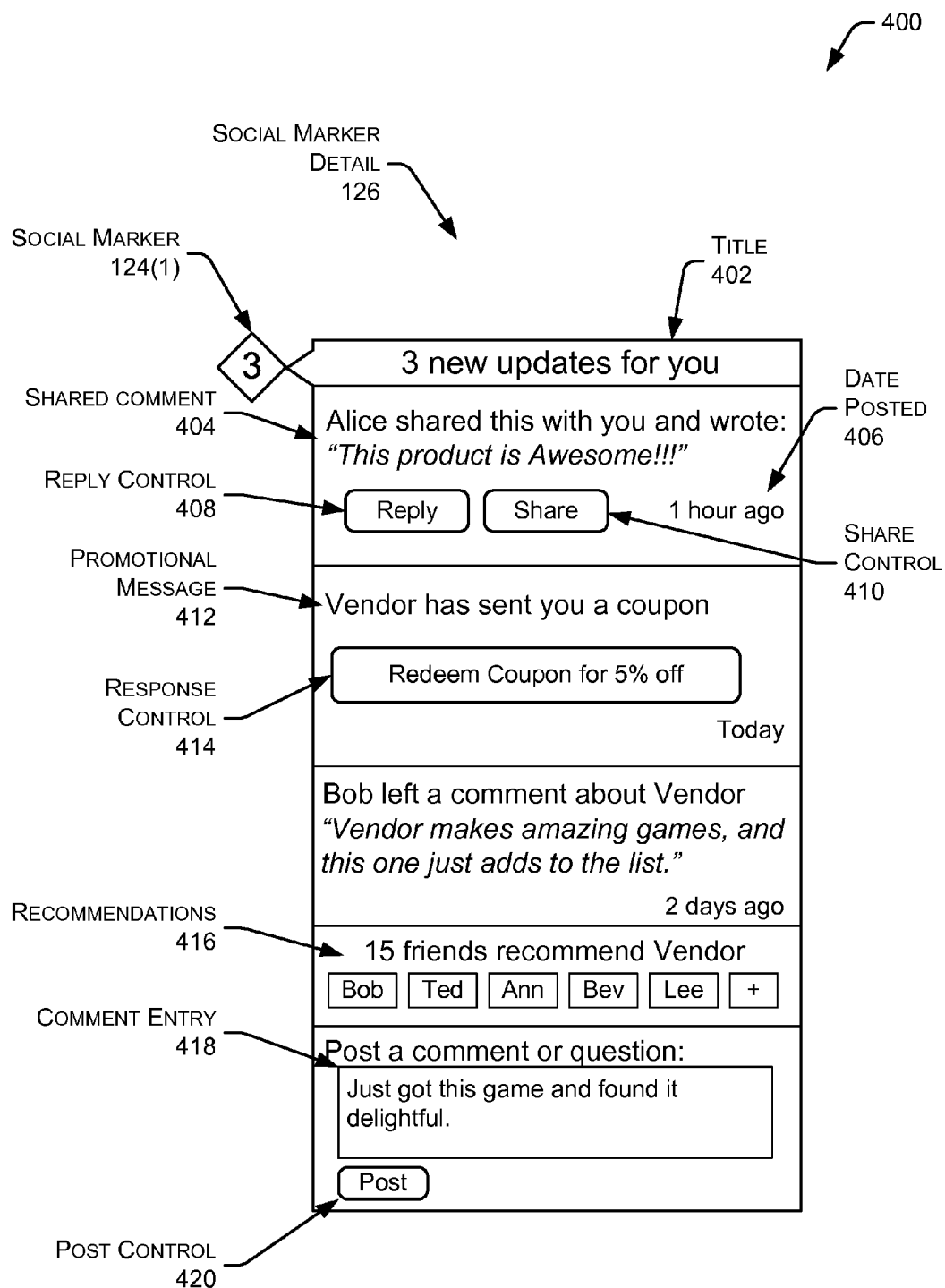
FIG. 4 illustrates a detailed view of a user interface presenting social marker detail.

FIG. 4 illustrates a detailed view of a user interface 400 presenting social marker detail 126. The social marker detail 126 provides information derived from at least a portion of the interaction data 218 which has been determined by the social marker module 226 to be relevant to the user 104. While the social marker 124 provides a quick and unobtrusive way to let a user know that they have information about the interactions, the social marker detail 126 provides access to at least some of that information.

A title 402 may be presented, such as indicating how many interactions are shown, the name of the target user, priority, and so forth. A first interaction is shown here comprising a shared comment 404 from a related user. This first interaction includes a date posted 406 as well as two controls. A reply control 408 allows the target user 104, who is viewing the social marker detail 126, to reply to the shared comment 404. This reply may be sent to an originating user 104 (such as Alice in this example), or to a group of users 104. This group of users 104 may comprise users 104 related to the target user 104 who is sending the reply, users 104 related to a recipient user 104, users 104 who are related to both the target user 104 and the recipient user, or all users.

A share control 410 allows the target user 104 who is viewing the social marker detail 126 to share the consumer object associated with the social marker 124 with one or more other users. In some implementations, these may be users 104 related to the target user 104, unrelated to the target user 104, or a combination thereof. For example, the target user 104 viewing the shared comment 404 may activate the share control 410 to share the comment with another user 104. The share control 410 may also be used to share other information about the consumer object which is presented in the social marker detail 126. For example, the social marker 124 may be configured to indicate that the target user's purchase has shipped. The target user may choose to share information about that shipment with another user, such as when the recipient is receiving the shipment as a gift. Thus, when the shipment information is an interaction configured for presentation in the social marker 124, the target user may use the share control to send that information along to another user.

A second interaction, which includes a promotional message 412 and a response control 414, is shown. The promotional message 412 depicted indicates that a particular vendor has sent the target user 104 a coupon. In other implementations, other promotional messages may be provided. For example, an advertisement for another product in the same brand may be presented. In some implementations, the promotional message 412 may be inserted into the social marker detail 126 during presentation or other interaction with the user. Continuing the example, after Bob's comment regarding the Vendor, an additional advertisement for a game sold by the Vendor may be presented in the social marker detail 126. The promotional messages 412 may be inserted in a batch, real-time, near real-time, or other process.

The response control 414, when activated, allows the target user 104 to redeem the coupon. This response control 414 may include a hyperlink, a script, a code, a serial number, executable code, and so forth.

A third interaction is shown depicting a comment by Bob. As illustrated here, in some implementations, the reply control 408 and the share control 410 may be omitted. For example, the first interaction is associated with a particular consumer object and includes controls 408 and 410. In contrast, the third interaction is more generalized, relating to a vendor, and thus these controls may be omitted. The presence of controls, such as the reply control 408, the share control 410, the response control 414, or other controls, may be determined by the social marker module 226.

Recommendations 416 may be depicted in the social marker detail 126. These recommendations may be to one or more consumer objects. As shown here, "Vendor" is shown as being recommended by Bob, Ted, Ann, Bev, Lee, and others. These recommendations 416 may include previously presented recommendations. For example, in one implementation, when Ted recommended the product to the target user 104(1), a social marker 124 would have appeared to the target user 104(1). Once the recommendation was viewed by the target user 104(1) on the user device 102, the social marker 124 would be discontinued until another interaction takes place, such as Bob recommending the product. Bob's recommendation may result in incrementing the social marker counter which may, at least in part, trigger the social marker 124. However, the older recommendation by Ted remains visible on the social marker detail 126.

The target user 104 may choose to enter a comment with a comment entry 418 control. Once entered, the comment may be posted by activating a post control 420. In some implementations, activation of the post control 420 or another control may provide the user 104 with selection options to designate one or more users 104 or groups of users to receive the comment.

The social marker detail 126 may also include additional information, which is not illustrated here. In one implementation the social marker detail 126 may include a previous purchase history, shipment information associated with a previous order, and so forth. For example, the social marker detail 126 may include an indication that the target user has placed an order for the consumer object, and include an estimated delivery date for that order and shipping information.

Illustrative Processes

Figure 5:
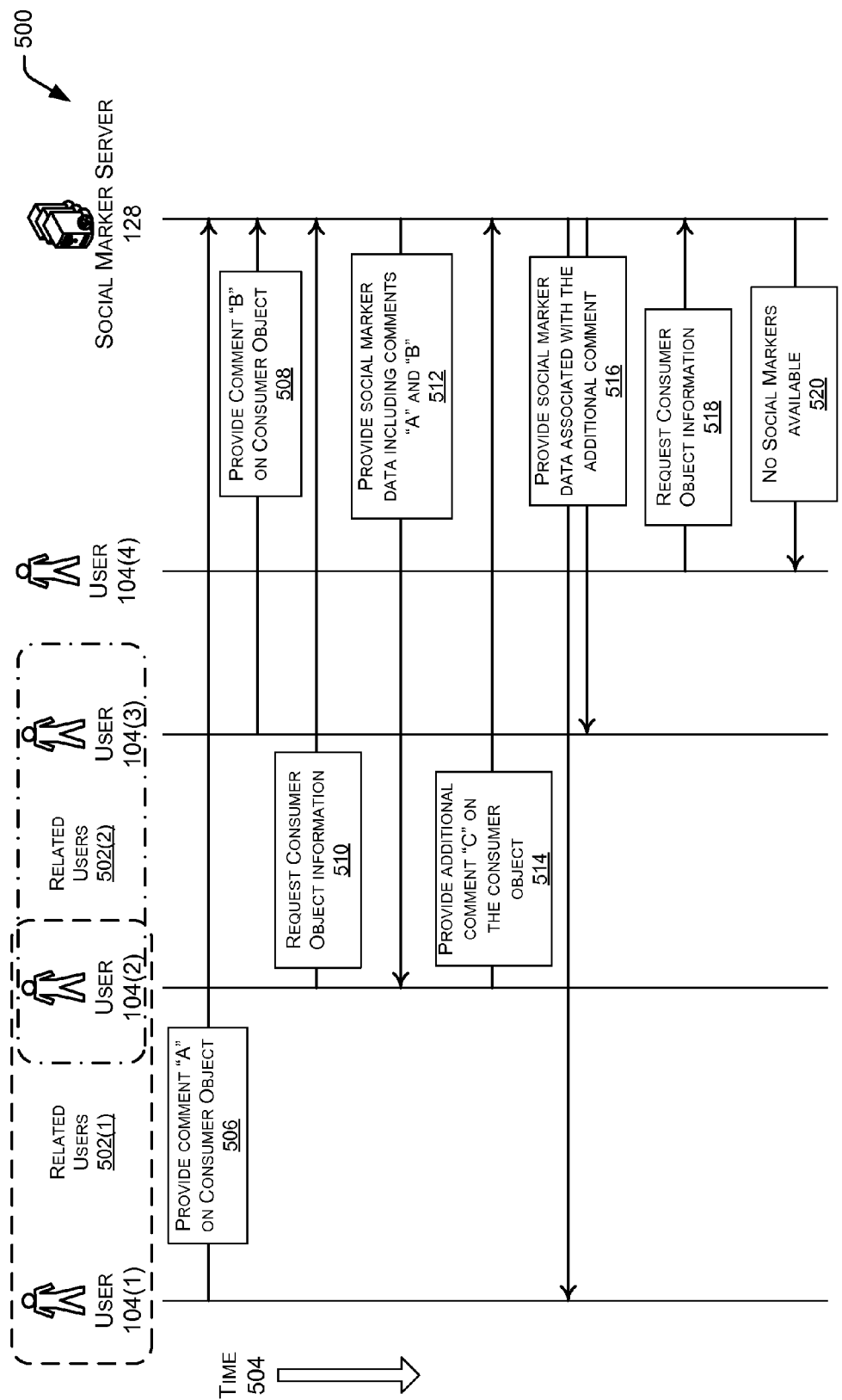
FIG. 5 illustrates a communication flow diagram of several interactions between users and the social marker server.

FIG. 5 illustrates a communication flow diagram 500 of several interactions between users 104 and the social marker server 128. By way of illustration, and not by way of limitation, four users are depicted 104(1)-104(4) having associated user devices 102 (not shown) as well as the social marker server 128. The communications may be transported by the network 130. In this illustration, the relationship module 224 has determined that users 104(1) and 104(2) are related to one another 502(1). The relationship module 224 has also determined that user 104(2) is also related 502(2) to 104(3). User 104(4) is unrelated to users 104(1)-104(3). In this diagram, time increases along the direction of arrow 504.

At 506, the user 104(1) communicates with the social marker server 128 to provide comment "A" on a consumer object. For example, the user 104(1) may be commenting on how well made a product is. This comment may be addressed to a particular group of users 104, or may be available to all.

At 508, the user 104(3) communicates with the social marker server 128 to provide comment "B" about the consumer object. Continuing the example, the user 104(3) may be commenting on the array of colors that the product is available in. As above, this comment may be addressed to a particular group of users 104, or may be available to all.

At 510, user 104(2) requests information about the consumer object from the social marker server 128, or from another server in communication with the social marker server 128 or the user. For example, the user 104(2) is looking for information on the product and requests information which includes that particular product. At 512, at least partly in response to the request, the social marker server 128 provides social marker data 132 for at least one social marker 124. In this example, this response may include social marker data 132 with the comments "A" and "B" made by the users 104(1) and 104(3), respectively. The social marker data 132 may include the social marker counter data for the social marker counter display 308, the shared comments 404, the promotional messages 412, and so forth as described above.

At 514, the user 104(2) may provide to the social marker server 128 an additional comment "C" on the consumer object. For example, the user 104(2) may view the social marker 124 and social marker detail 126 and add personal experience with regard to an earlier model of the product. At 516, the social marker server 128 provides social marker data 132 comprising the additional comment "C" to the users 104(1) and 104(3). This may be in response to a request by the users 104(1) and 104(3), or may have been pushed or sent without query to the user devices 102 associated with the users 104(1) and 104(3). The user 104(2) does not see a social marker 124 associated with this comment because it originated with user 104(2).

At 518, the user 104(4) requests information about the consumer object from the social marker server 128 or another server. This may be the same product which was the subject of the comments "A," "B," and "C" discussed above. For example, the user 104(4) may request information about the product. At 520, the social marker server 128 returns that no social markers are available for the user 104(4). Because the user 104(4) is unrelated to user 104(2), no social marker 124 is presented.

The comments or other interaction data 218 associated with the consumer object may be available to the unrelated user 104(4). For example, the user 104(4) may view detail information about the product which may include the comments "A," "B," and "C," recommendations from the users, and so forth. However, because no relationship exists between users 104(1)-104(3) and the user 104(4), no social marker 124 is presented to the user 104(4).

Figure 6:
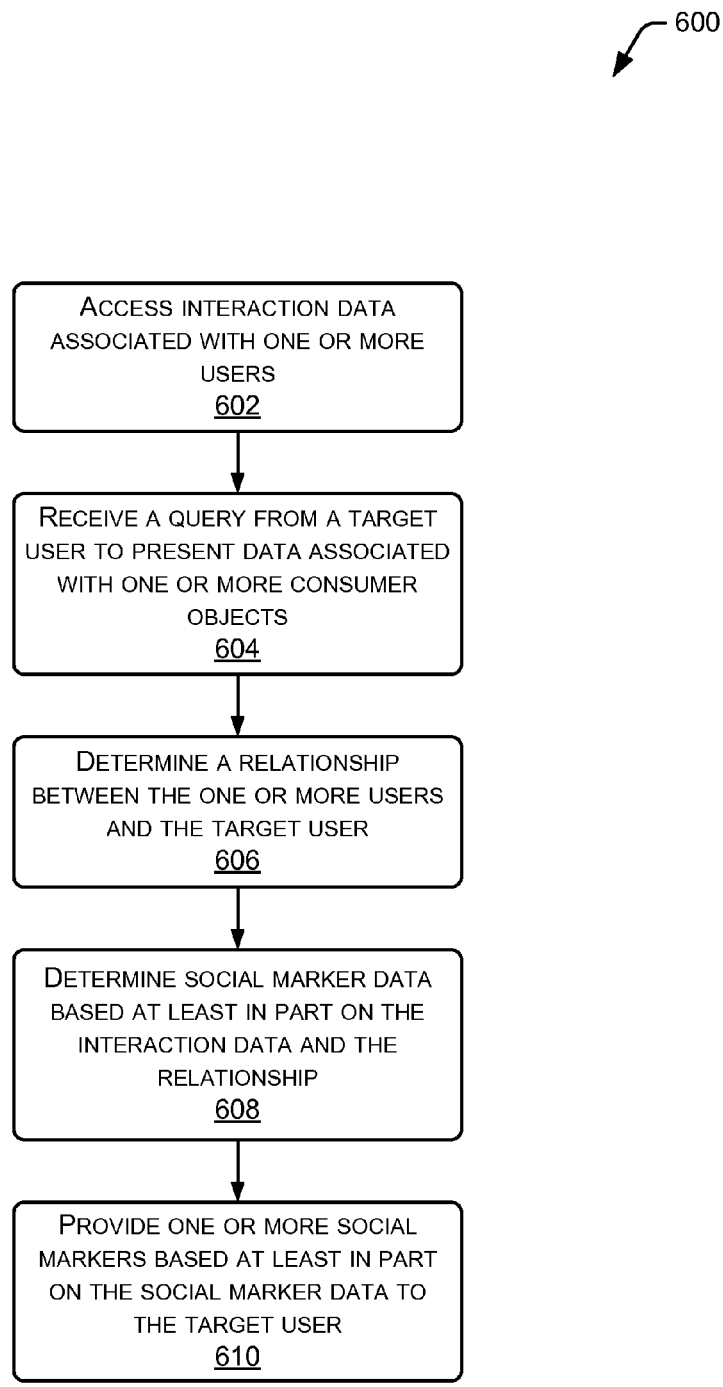
FIG. 6 illustrates a flow diagram of a process of generating a social marker.

FIG. 6 illustrates a flow diagram 600 of a process of generating a social marker. The process may be performed at least in part by the user device 102, the social marker server 128, another device, or a combination thereof.

Block 602 accesses interaction data 218 associated with one or more users 104(U). As described above, this interaction data 218 may comprise inquiries, page views, purchases, shares, replies, messages, recommendations, blog entries, modification of a wish list, or a combination thereof associated with the one or more consumer objects. The one or more consumer objects comprise a product, a service, a brand associated with one or more products or services, or a combination thereof. For example, the accessed interaction data 218 may be that the user 104(11) has previously commented on a particular object.

Block 604 receives a query from a target user 104(1) to present consumer object data 216 associated with one or more consumer objects. For example, the target user 104(1) may navigate an Internet browser to a merchant Internet page containing presentation of several consumer objects which invokes a query for data about those objects. The particular object commented on by the user 104(11) may be included in this presentation.

Block 606 determines a relationship between the one or more users 104(U) and the target user 104(1). As described above the social marker module 226 may retrieve relationship information from the user data 214 or generated by the relationship module 224. Continuing the example, the target user 104(1) may be determined to be friends with the user 104(11). The target user 104(1) may be identified by receiving login credentials, inspecting a cookie associated with an Internet browser, from biometric data, and so forth.

Block 608 determines social marker data 132 based at least in part on the interaction data 218 and the relationship. As described above with respect to the social marker module 226, in this example, this determination may utilize the comment made by the user 104(11), the target user's 104(1) query, and the relationship between users 104(1) and 104(11).

Block 610 provides one or more social markers 124 based at least in part on the social marker data 132 to the target user 104(1). For example, the social marker server 128 may send to the user device 102 the social marker data 132 which the user device 102 may then present as the social marker 124 on the display 110. As described above, the one or more social markers may each comprise an icon. The icon may be presented or configured for presentation adjacent to or coincident with a presentation element representative of the one or more consumer objects. In some implementations, the icon may comprise a numeric representation of a value in the social marker counter. The social marker counter may be configured to count a number of interactions between related users and the consumer object.

Figure 7:
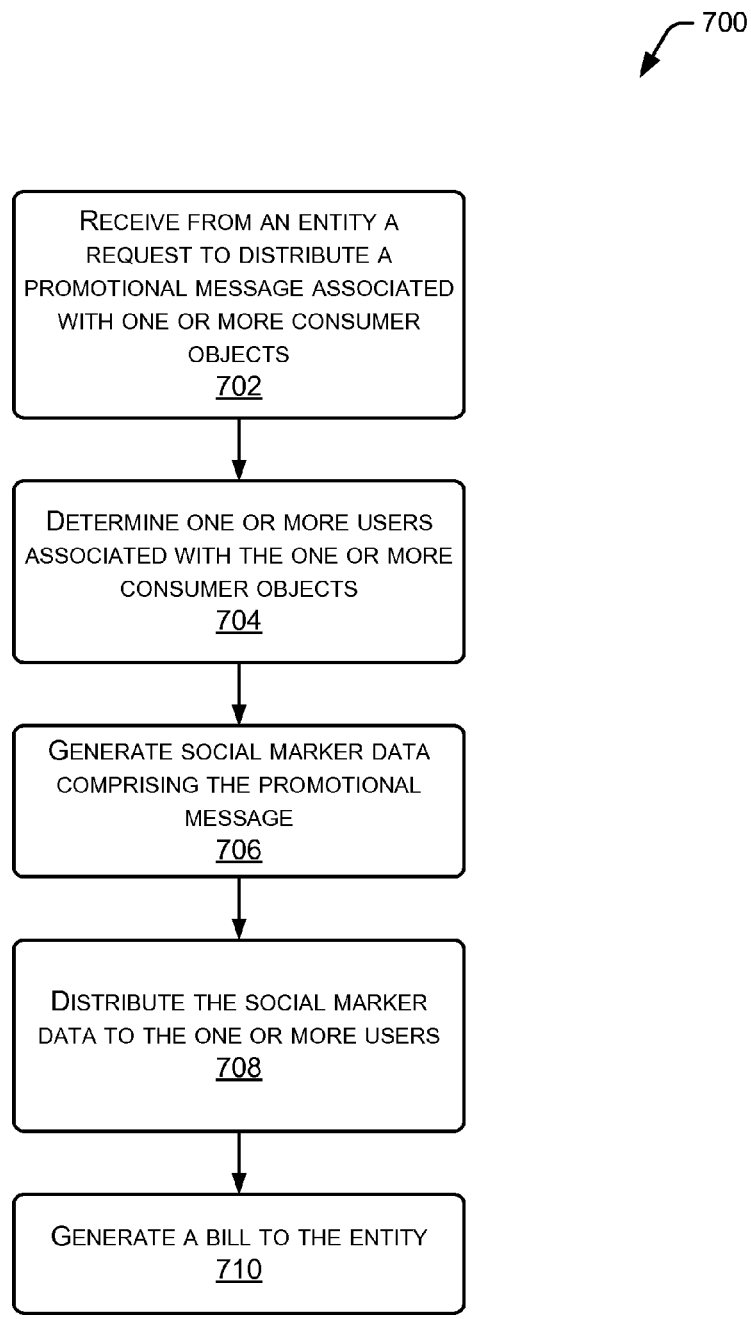
FIG. 7 illustrates a flow diagram of a process of distributing a promotional message via a social marker.

FIG. 7 illustrates a flow diagram 700 of a process of distributing a promotional message via a social marker 124. The process may be performed at least in part by the user device 102, the social marker server 128, another device, or a combination thereof.

Block 702 receives from an entity a request to distribute a promotional message associated with one or more consumer objects. The entity may comprise an individual, a company, a group of companies, a marketing cooperative, and so forth. The request may be processed by one or more intermediate servers or service providers. The promotional message may include, but is not limited to, text, sound, graphic, video, or a combination thereof. For example, the promotional message may be text and a link associated with a coupon for a product. In some implementations, the promotional message may be stored at least in part in the promotional data 220 of the datastore 212.

Block 704 determines one or more users 104 associated with the one or more consumer objects. In some implementations, this determination may be based at least in part on the interaction data 218. For example, social marker module 226 may determine the users 104 who have interaction data 218 indicating that they have inquired about the product.

Block 706 generates social marker data 132 comprising the promotional message. In some implementations, this social marker data 132 may be based at least in part on the interaction data 218 as well as the user data 214, the consumer object data 216, and so forth. The social marker data 132 may comprise an icon or a reference thereto, social marker counter data, or a combination thereof. When rendered by the user device 102, the social marker data 132 presents the social marker 124, the social marker detail 126, or both.

Block 708 distributes the social marker data 132 to the one or more users. In some implementations, this distribution may comprise sending the social marker data via the network 130 to one or more user devices 102 associated with the one or more users.

Block 710 generates a bill to the entity. This bill may be for payment, credits, promotional consideration, and so forth. As described above, in some implementations, remuneration may be received in return for providing one or more social markers 124 to the users 104.

Figure 8:
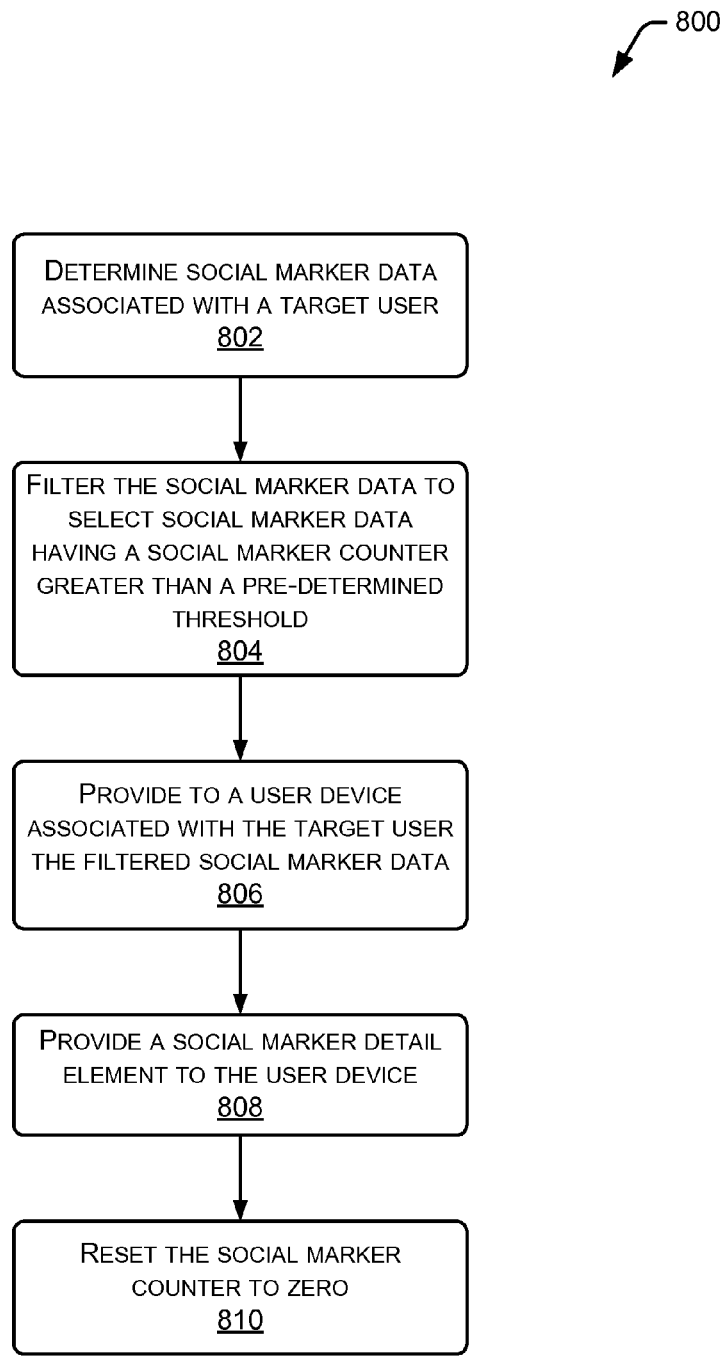
FIG. 8 illustrates a flow diagram of a process of presenting a social marker.

FIG. 8 illustrates a flow diagram 800 of a process of presenting the social marker. The process may be performed at least in part by the user device 102, the social marker server 128, another device, or a combination thereof.

Block 802 determines the social marker data 132 based at least in part on the interaction data 218 and the relationship with the target user 104(1). In some implementations, the social marker data 132 may be determined as described above with respect to the process 600 in FIG. 6.

Block 804 filters the social marker data 132 to select social marker data having a social marker counter greater than a pre-determined threshold. As described above, the social marker counter indicates a number of interactions, such as messages, associated with the consumer object from related users. In some implementations, each interaction may increment the counter.

In another implementation, the social marker data 132 may be filtered by one or more attributes. For example, instead of, or in addition to the social marker counter and pre-determined threshold, the social marker data 132 may be filtered by a particular user 104, by date, by content, and so forth.

The pre-determined threshold may be statically or dynamically set. The threshold may be set by a system administrator and applicable to one user 104 or a group of users 104. In another implementation, individual users 104 may set their threshold value. The threshold may be dynamically set, such as by comparing when the user selects the social marker 124 to the counter value. For example, some users 104 may typically disregard social markers 124 until they have three or more interactions. Thus, for those users 104, the system may dynamically adjust so that social markers 124 are presented when there are at least three interactions.

Block 806 provides to a user device 102 associated with the target user 104 the filtered social marker data. As described above, the social marker data is configured to present a social marker when presented on the user device 102.

Block 808 provides to the user device 102 a social marker detail 126 element. The social marker detail 126 element may comprise at least a portion of the interaction data 218. In some implementations, the social marker detail 126 element may be configured for presentation upon selection of the social marker 124. For example, when the user hovers over the social marker 124, the social marker detail 126 element may be presented.

Block 810 resets the social marker counter to zero. This reset, in combination with the pre-determined threshold, may be used to limit presentation of social markers 124 to information which has not been previously presented to the target user 104. This reset may occur before or after presentation of the social marker detail 126 element to the user 104 on the user device 102.

Figure 9:
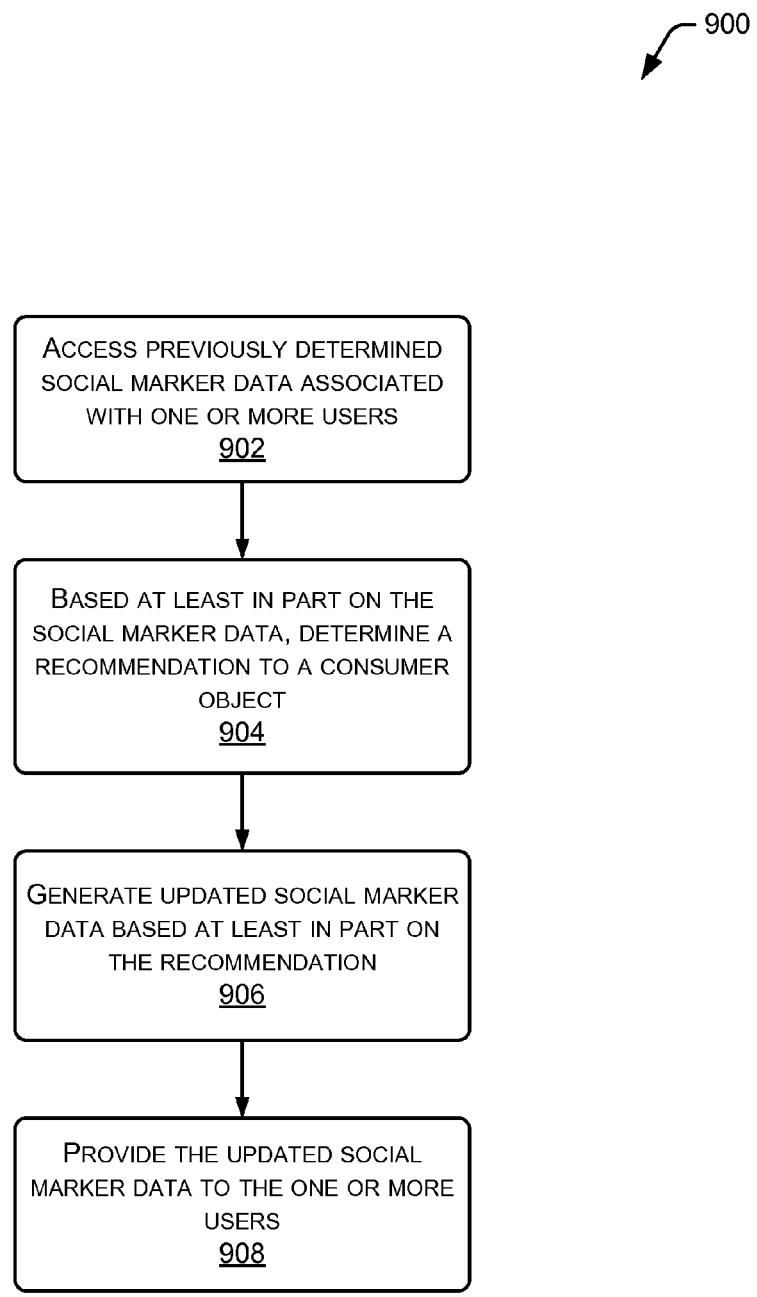
FIG. 9 illustrates a flow diagram of a process of providing recommendations based at least in part on social marker data.

FIG. 9 illustrates a flow diagram 900 of a process of providing recommendations based at least in part on social marker data. The process may be performed at least in part by the user device 102, the social marker server 128, another device, or a combination thereof.

Block 902 accesses previously determined social marker data 132 associated with one or more users 104. In one implementation, the social marker module 226 may retrieve data at least in part from the datastore 212. As described above with regard to FIG. 6, the previously determined social marker data 132 may be determined in some implementations by associating the consumer object to at least a portion of the one or more users 104 based at least in part on interaction data 218 and determining relationships between the one or more users 104.

Block 904 determines, based at least in part on the previously determined social marker data, a recommendation to a consumer object. For example, a user 104 having a social marker 124 associated with a lawnmower may receive a recommendation for a lawn care service.

Block 906 generates updated social marker data based at least in part on the recommendation. For example, the recommendation may be considered in some implementations as an interaction with the lawn care service.

Block 908 provides the updated social marker data to the one or more users. For example, the updated social marker data may be transmitted to the user device 102 using the network 130. In another implementation, the updated social marker data may be provided to a content server, a merchant server, and so forth which, in turn, may distribute or otherwise present the updated social marker data as social markers 124.

Conclusion

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
    at least one memory storing computer-executable instructions;
    at least one processor configured to access the at least one memory and execute the computer-executable instructions to:
        access interaction data associated with one or more users and one or more consumer objects;
        receive a query from a target user to present data associated with the one or more consumer objects;
        determine a relationship between the one or more users and the target user;
        determine social marker data based at least in part on the interaction data and the relationship;
        filter the social marker data to select social marker data having a social marker counter greater than or equal to a pre-determined threshold;
        provide, to a user device associated with the target user, the filtered social marker data; and
        provide, for display at the user device, one or more social markers based at least in part on the filtered social marker data, wherein the one or more social markers comprise a respective icon that overlays at least a portion of the one or more consumer objects, the respective icon comprising a numeric representation of a value in a social marker counter configured to count a number of interactions with the one or more consumer objects, wherein the respective icon, when selected, causes presentation of a social marker detail element adjacent to the respective icon, the social marker detail element comprising one or more shared comments, one or more controls that facilitate interaction with the one or more shared comments, at least a portion of a promotional message, and one or more controls that facilitate interaction with the promotional message.

2. The system of claim 1, the interaction data comprising inquiries, page views, purchases, shares, replies, messages, recommendations, blog entries, modification of a wish list, or a combination thereof associated with the one or more consumer objects.

3. The system of claim 1, the one or more consumer objects comprising a product, a service, a brand associated with one or more products or services, or a combination thereof.

4. The system of claim 1, the at least one processor further configured to execute the computer-executable instructions to:
    after the respective icon is selected, generate the social marker detail element.

5. The system of claim 1, wherein presentation of the social marker detail element causes removal of the respective icon.

6. The system of claim 5, wherein the interaction data comprises first interaction data, and wherein the at least one processor is further configured to:
    determine second interaction data associated with the one or more users and the one or more consumer objects;
    provide the second interaction data for presentation, wherein presenting the second interaction data causes the respective icon to be redisplayed.

7. The system of claim 1, wherein the relationship between the one or more users and the target user comprises a first relationship, and wherein the at least one processor is further configured to execute the computer-executable instructions to:
    determine a second relationship between a portion of the one or more users and the target user, wherein the numeric representation of the value in the respective icon comprises a number of interactions with the portion of the one or more users.

8. The system of claim 1, wherein the computer-executable instructions that configure the at least one processor to provide the one or more social markers further comprise computer-executable instructions that configure the at least one processor to output the one or more social markers at least one of haptically or audibly.

9. The system of claim 8, wherein when the one or more social markers are output haptically, the at least one processor is further configured to output the one or more social markers using different respective surface textures in one or more locations on a screen of a device comprising the at least one processor.

10. The system of claim 1, wherein the respective icon comprises at least one of a graph or an animation to indicate the number of interactions with the one or more consumer objects.

11. A system, comprising:
    at least one memory storing computer-executable instructions;
    at least one processor configured to access the at least one memory and execute the computer-executable instructions to:
        receive from an entity a request to distribute a promotional message associated with one or more consumer objects;
        determine one or more users associated with the one or more consumer objects;
        generate social marker data comprising the promotional message and one or more social markers;
        filter the social marker data to select social marker data having a social marker counter greater than or equal to a pre-determined threshold; and
        distribute the filtered social marker data to the one or more users for display at a user device, wherein the filtered one or more social markers comprise a respective icon that overlays at least a portion of the one or more consumer objects, the respective icon comprising a numeric representation of a value in a social marker counter configured to count a number of interactions with the one or more consumer objects, wherein the respective icon, when selected, causes presentation of a social marker detail element adjacent to the respective icon, the social marker detail element comprising at least a portion of the promotional message and one or more controls that facilitate interaction with the promotional message.

12. The system of claim 11, the at least one processor further configured to generate a bill to the entity.

13. The system of claim 11, wherein the computer-executable instructions for the distribution further comprise computer-executable instructions that configure the at least one processor to send the social marker data via a network.

14. The system of claim 11, the social marker data comprising social marker counter data.

15. The system of claim 11, the at least one processor further configured to execute the computer-executable instructions to determine a relationship between the one or more users.

16. One or more non-transitory computer-readable media storing computer-executable instructions that, when executed by at least one processor, configure the at least one processor to perform operations comprising:
   accessing interaction data comprising interactions between one or more users and one or more consumer objects;
   determining a relationship between the one or more users and a target user;
   determining social marker data based at least in part on the interaction data and the relationship with the target user; and
   filtering the social marker data to select social marker data having a social marker counter greater than or equal to a pre-determined threshold;
   providing, to a user device associated with the target user, the filtered social marker data; and
   providing, for display at the user device, one or more social markers based at least in part on the filtered social marker data, wherein the one or more social markers comprise a respective icon that overlays at least a portion of the one or more consumer objects, the respective icon comprising a numeric representation of a value in a social marker counter configured to count a number of interactions with the one or more consumer objects, wherein the respective icon, when selected, causes presentation of a social marker detail element adjacent to the respective icon, the social marker detail element comprising one or more shared comments, one or more controls that facilitate interaction with the one or more shared comments, at least a portion of a promotional message, and one or more controls that facilitate interaction with the promotional message.

17. The one or more non-transitory computer-readable media of claim 16, the at least one processor further configured to execute the computer-executable instructions to perform the operations comprising resetting the social marker counter to zero.

18. The one or more non-transitory computer-readable media of claim 16, the interaction data comprising a message entered by one of the one or more users.

19. The one or more non-transitory computer-readable media of claim 16, the at least one processor further configured to execute the computer-executable instructions to perform the operations comprising:
   filtering the social marker data by one or more attributes; and
   providing, to a user device associated with the target user, the filtered social marker data, wherein the filtered social marker data is configured to generate the one or more social markers.

20. One or more non-transitory computer-readable media storing computer-executable instructions that, when executed by at least one processor, configure the at least one processor to perform operations comprising:
   accessing previously determined social marker data associated with one or more users;
   based at least in part on the previously determined social marker data, determining a recommendation to a consumer object;
   generating updated social marker data based at least in part on the recommendation;
   filtering the updated social marker data to select social marker data having a social marker counter greater than or equal to a pre-determined threshold; and
   providing, to a user device associated with the one or more users, a social marker based at least in part on the filtered social marker data, wherein the social marker comprises an icon that overlays at least a portion of the consumer object, the icon comprising a numeric representation of a value in a social marker counter configured to count a number of interactions with the one or more consumer objects, wherein the icon, when selected, causes presentation of a social marker detail element adjacent to the icon, the social marker detail element comprising the recommendation, one or more controls that facilitate interaction with the recommendation, at least a portion of a promotional message, and one or more controls that facilitate interaction with the promotional message.

21. The one or more non-transitory computer-readable media of claim 20, the at least one processor further configured to execute the computer-executable instructions to perform the operations-comprising:
   providing the updated social marker data to at least a portion of the one or more users.

22. The one or more non-transitory computer-readable media of claim 20, the at least one processor further configured to execute the computer-executable instructions to generate the previously determined social marker data, wherein generating the previously determined social marker data comprises:
   associating the consumer object to at least a portion of the one or more users based at least in part on interaction data; and
   determining one or more relationships between the one or more users.

* * * * *